(12) United States Patent
Rounds

(10) Patent No.: US 7,267,392 B1
(45) Date of Patent: Sep. 11, 2007

(54) UTILITY TRAILER TRANSPORT ASSEMBLY

(76) Inventor: Michael Rounds, 157 County Rd. 2300 North, Mahomet, IL (US) 61853

(*) Notice: Subject to any disclaimer, the term of this patent is extended or adjusted under 35 U.S.C. 154(b) by 137 days.

(21) Appl. No.: 10/974,158

(22) Filed: Oct. 27, 2004

(51) Int. Cl.
*B60P 7/00* (2006.01)

(52) U.S. Cl. .................. 296/168; 296/26.15; 410/1; 410/80

(58) Field of Classification Search .............. 296/168, 296/171, 173, 175, 26.15; 410/1, 56, 61, 410/68, 80
See application file for complete search history.

(56) References Cited

U.S. PATENT DOCUMENTS

| | | | |
|---|---|---|---|
| 2,782,733 A * | 2/1957 | Ewing | ............ 410/1 |
| 3,380,607 A | 4/1968 | Dale | |
| 3,556,582 A | 1/1971 | Bledsoe | |
| 3,563,596 A | 2/1971 | Davis | |
| 3,651,969 A | 3/1972 | Bledsoe | |
| 3,751,073 A | 8/1973 | Alexander et al. | |
| 3,997,211 A | 12/1976 | Graves | |
| 4,188,056 A | 2/1980 | Watson | |
| 4,923,243 A | 5/1990 | Drahos | |
| 5,069,471 A | 12/1991 | Van Der Linden et al. | |
| 5,505,514 A | 4/1996 | Green | |
| 5,997,073 A * | 12/1999 | Vanderhoof | |
| 6,283,537 B1 | 9/2001 | DeVore, III | |
| 6,669,269 B1 | 12/2003 | Tran-Ngoc | |
| 6,688,672 B2 | 2/2004 | Kay | |
| 6,736,446 B1 | 5/2004 | Johnson | |
| 6,761,387 B2 | 7/2004 | Sloss | |
| 2006/0158004 A1 | 7/2006 | Harris et al. | |

* cited by examiner

*Primary Examiner*—Stephen Gordon
(74) *Attorney, Agent, or Firm*—Lonnie E. Holder

(57) ABSTRACT

A utility trailer transport system is disclosed, wherein the utility trailer in the form of a pop-up camper is rotatably mounted via one of a plurality of structures on a transport trailer. The camper is positioned in one orientation for transport and a second orientation for use. A bed on the transport trailer serves to transport equipment and as a deck when the camper is in the second orientation.

8 Claims, 8 Drawing Sheets

UTILITY TRAILER TRANSPORT ASSEMBLY

BACKGROUND OF THE INVENTION

This invention relates to campers or other similar utility trailers mounted on a transport trailer. Such combinations permit transport of a variety of equipment such as motorcycles, all-terrain vehicles (ATVs), lawn and garden equipment, a boat or any equipment suitable for transport in combination with a camper or other utility trailer.

One difficulty with combining a camper or utility trailer with a transport trailer is the difficulty of using the camper or trailer once a destination is reached. For example, the distance from the bed of a typical transport trailer to the ground may be enough to make side access, which is common among devices of this type, very difficult. To solve this problem a ladder, collapsible or removable deck or platform, or other similar device may be required, adding cost, complexity and inconvenience.

SUMMARY OF THE INVENTION

The present invention provides a camper or other similar utility trailer mounted on a transport trailer so that the camper or utility trailer is rotatable between a first position and a second position. The first position is generally a transport position. The second position is a position where a user may gain access to a side of the camper or utility trailer. In the second position the bed of the transport trailer serves to provide access to the side of camper or utility trailer, and thus may serve as a deck. Thus the invention serves to simplify the needs of transport of a camper or utility trailer on a transport trailer that may also be used to transport a variety of equipment such as motorcycles, ATVs, personal watercraft, a boat, lawn and garden equipment or any other suitably transportable devices.

A better understanding of the objects, advantages, features, properties and relationships of the invention will be obtained from the following detailed description and accompanying drawings which set forth an illustrated embodiment and which are indicative of the various ways in which the principles of the invention may be employed.

DETAILED DESCRIPTION

The present invention is described in relation to a pop-up camper rotatably mounted to a transport trailer. However, other uses will be apparent. For example, in place of a transport trailer a truck with a flatbed portion may be substituted. Also, while a pop-up camper is a preferred embodiment, other types of utility trailers may find the exemplary embodiments described herein to be advantageous for accessing such utility trailers for loading or unloading, for service or maintenance, for accessing controls or mechanisms mounted within the utility trailer, or other accessibility purposes.

In the embodiments shown herein similar elements are provided with the same number and a prefix. As an example, items 30, 130 and 230 describe various embodiments of a transport trailer.

Figure 1:
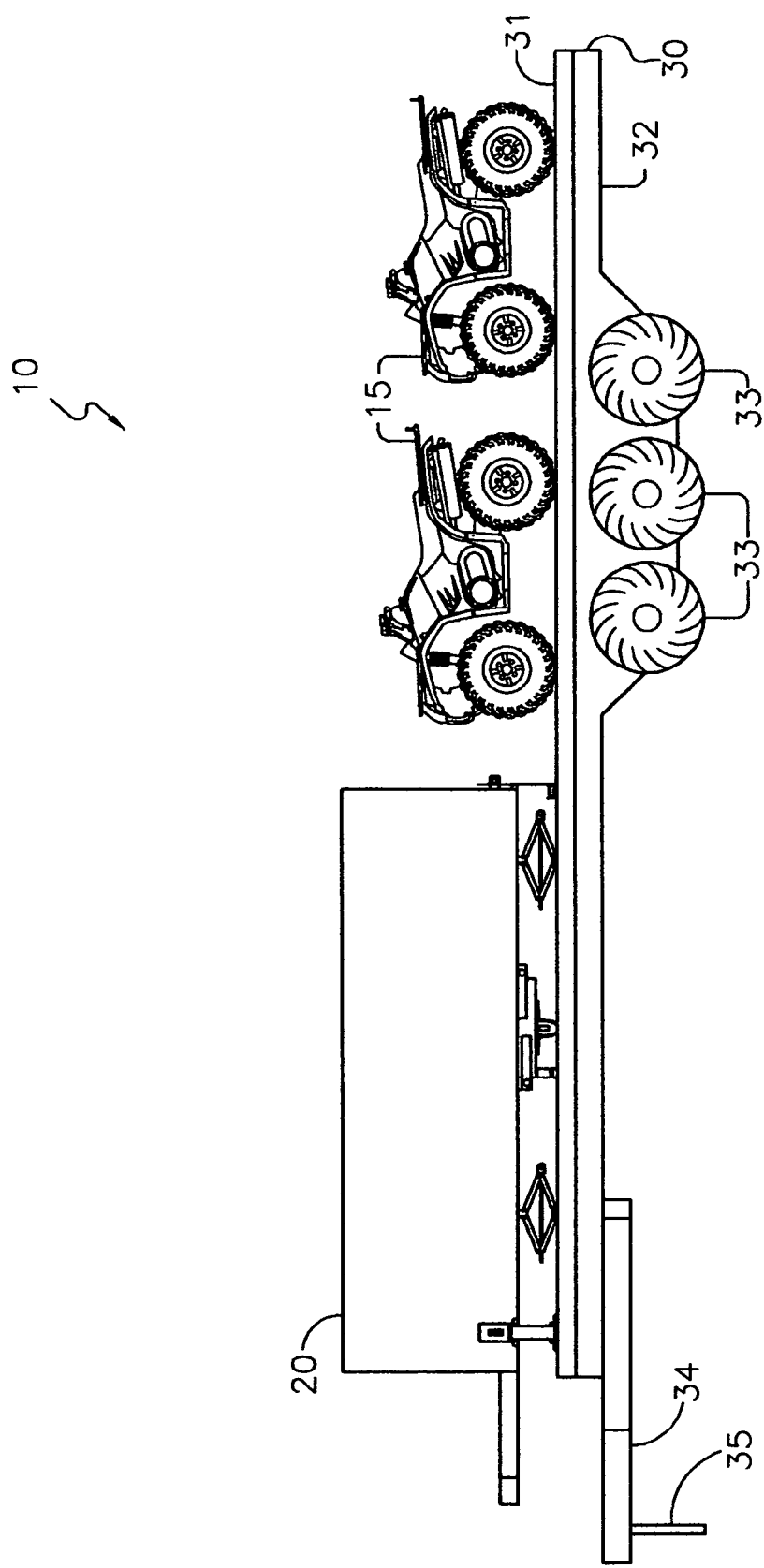
FIG. 1 is a side elevational view of a utility trailer in the form of a pop-up camper mounted on a transport trailer in a first position.

FIG. 1 depicts a trailer apparatus 10 that further consists of a utility trailer 20 rotatably mounted on a transport trailer 30. In the embodiments described herein utility trailer 20 is a pop-up camper or similar camper with a low profile capable of highway transport in the position shown.

Transport trailer 30 has a trailer frame 32, comprising a bed 45. Bed 45 is generally a metal such as steel or aluminum. Overlaid on bed 45 is an optional wood bed 31. Throughout the description herein it will be understood that attachment of the described elements may be to either wood bed 31 or trailer bed 45. Further, while the term "wood" is used to describe bed 31, it will also be understood that such description is for convenience of terminology and other materials such as plastic may provide a suitable bed surface. Transport trailer 30 is supported by a plurality of wheels 33 and a tow hitch assembly 34 that is supported by post 35 in FIG. 1 in lieu of a towing vehicle.

Figure 2:
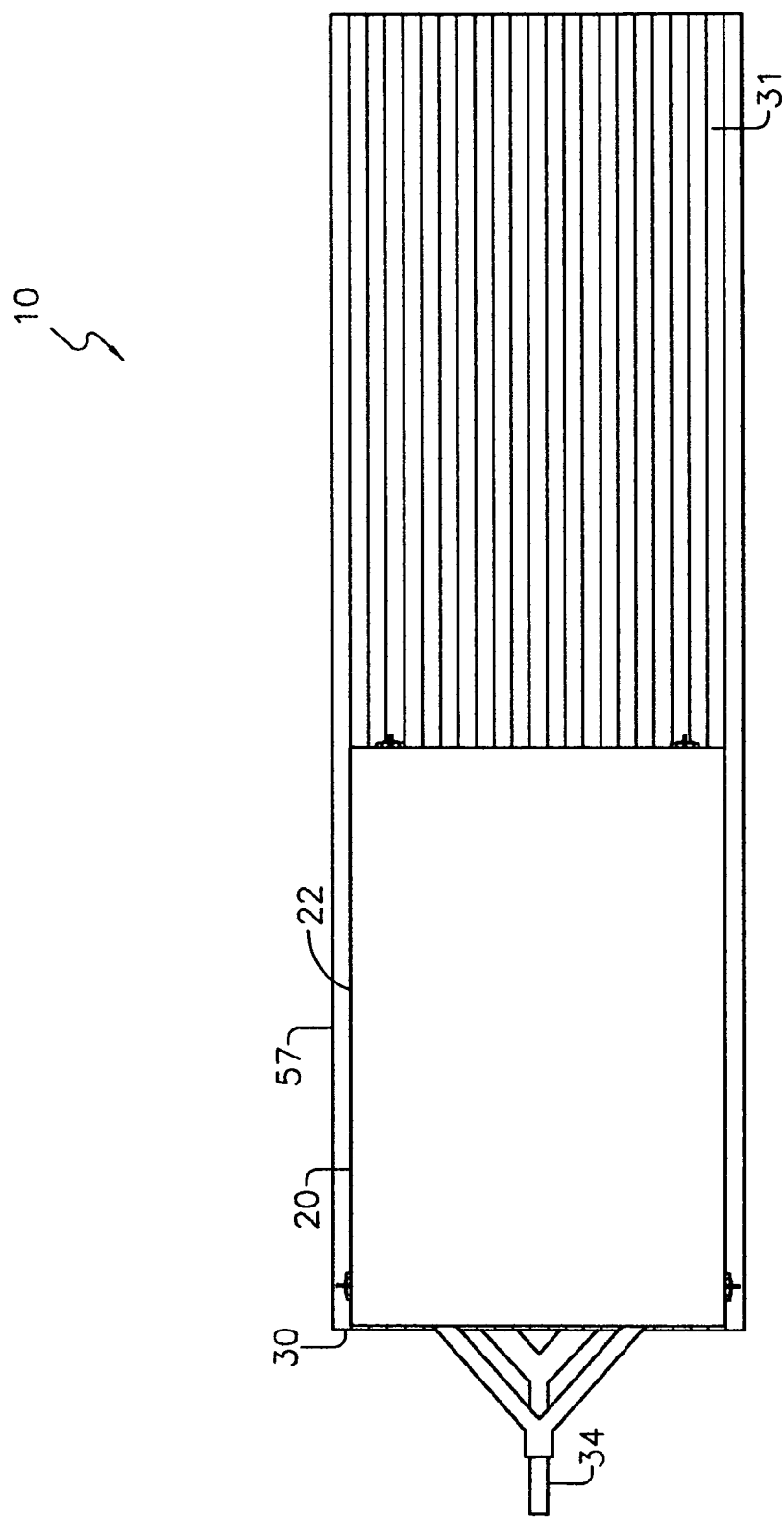
FIG. 2 is a top plan view of the apparatus of FIG. 1.

Pop-up camper 20 is shown in a transport position in FIGS. 1 and 2. As will be described in more detail later, camper 20 is secured in the transport position by one or more of a plurality of methods. Also shown in FIG. 1 are ATVs 15, which are but one of the numerous types of equipment that may be transported on wood bed 31. In the other figures ATVs 15 have been removed for clarity.

Camper 20 is rotatably mounted to bed 45 of transport trailer 30. In the first embodiment configuration shown in FIGS. 4-7, a support post assembly 40 is attached to bed 45. A support frame assembly 50 is attached to leaf spring attach points 42a and 42b of camper 20 with fasteners 43.

During movement of trailer apparatus 10 from one location to another location camper 20 is supported by a plurality of supports in the form of scissor jacks 36, which are extended so that the weight of camper 20 is fully supported by scissor jacks 36. In order to prevent the rotation of camper 20 during transport, posts 38 welded or attached to the bottom of each scissor jack 36 extend into openings 39 shown in FIGS. 4, 8, and 9. In the embodiments shown herein there are four scissor jacks 36. Openings 39 are preferably symmetric about the center of rotation of camper 20 so that openings 39 may interface with posts 38 when camper 20 is in a transport position and a second position other than a transport position. In the embodiments shown herein openings 39 form a square about the center of rotation of camper 20.

Camper 20 may be further secured by a plurality of clamps 46 that are attached to camper 20. The four clamps 46 shown clamp onto brackets 48 attached to wood bed 31 of trailer 30. Alternatively, brackets 48 may be attached to bed 45, as previously described. Due to the vibration of travel it may also be necessary to provide brackets 52 that extend through slots 54 formed in clamps 46. Quick release pins, fasteners, locks or a variety of other similar devices (not shown) may be inserted through holes 56 in latch brackets 52 to prevent clamps 46 from vibrating or bouncing into an unlatched positioned.

Figure 3:
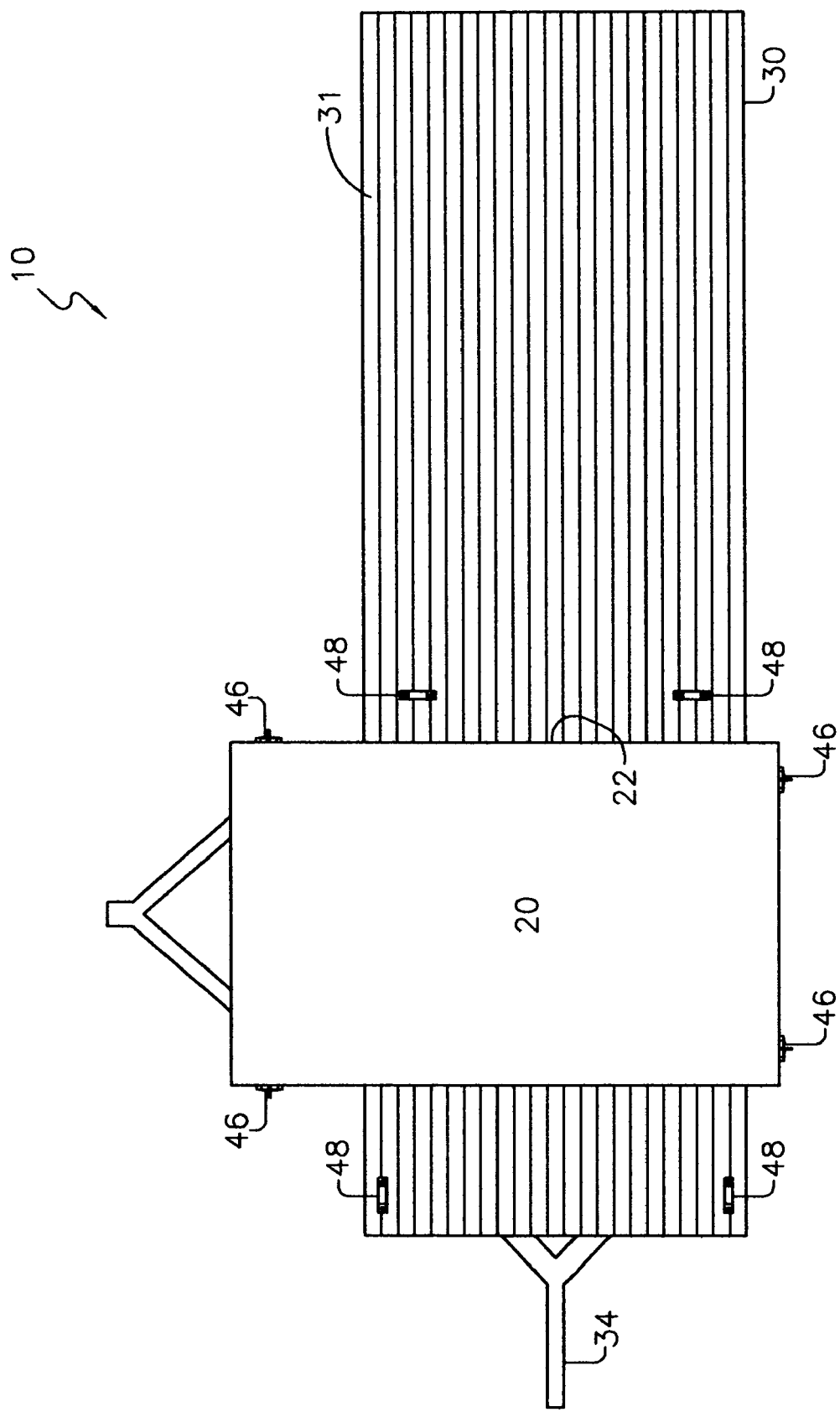
FIG. 3 is a top plan view of the apparatus of FIG. 1 with the pop-up camper rotated to a second position.
Figure 4:
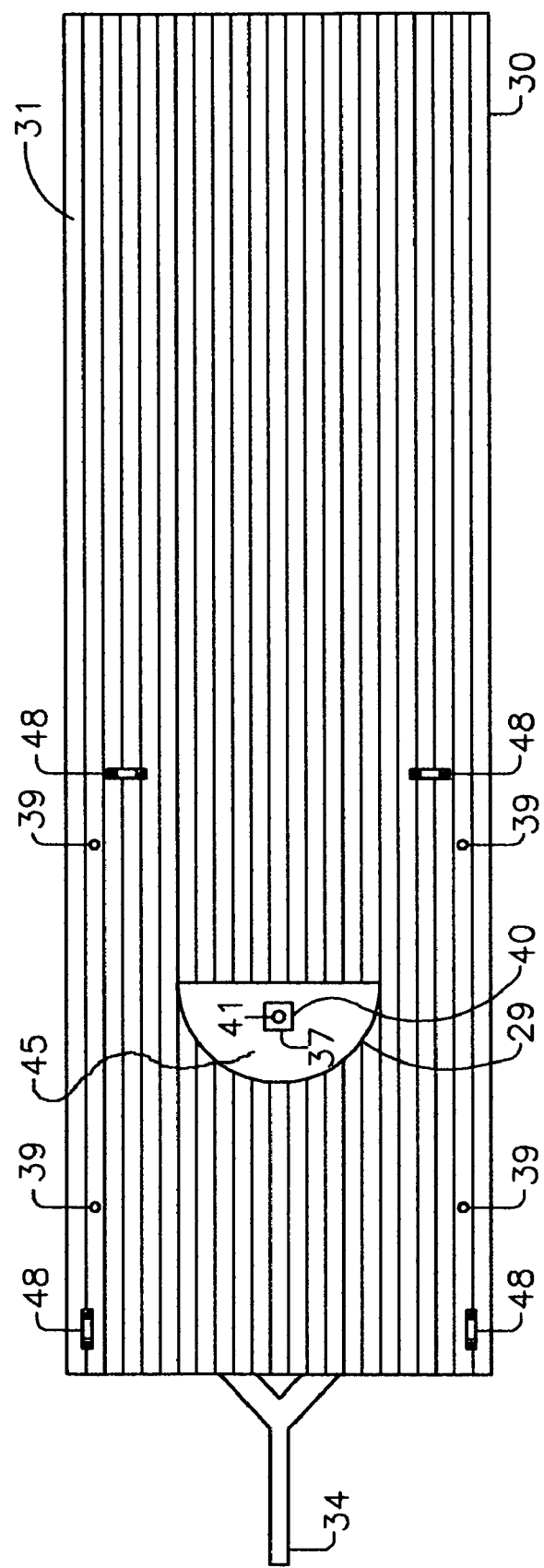
FIG. 4 is a top plan view of the apparatus of FIG. 1 with the pop-up camper removed.
Figure 5:
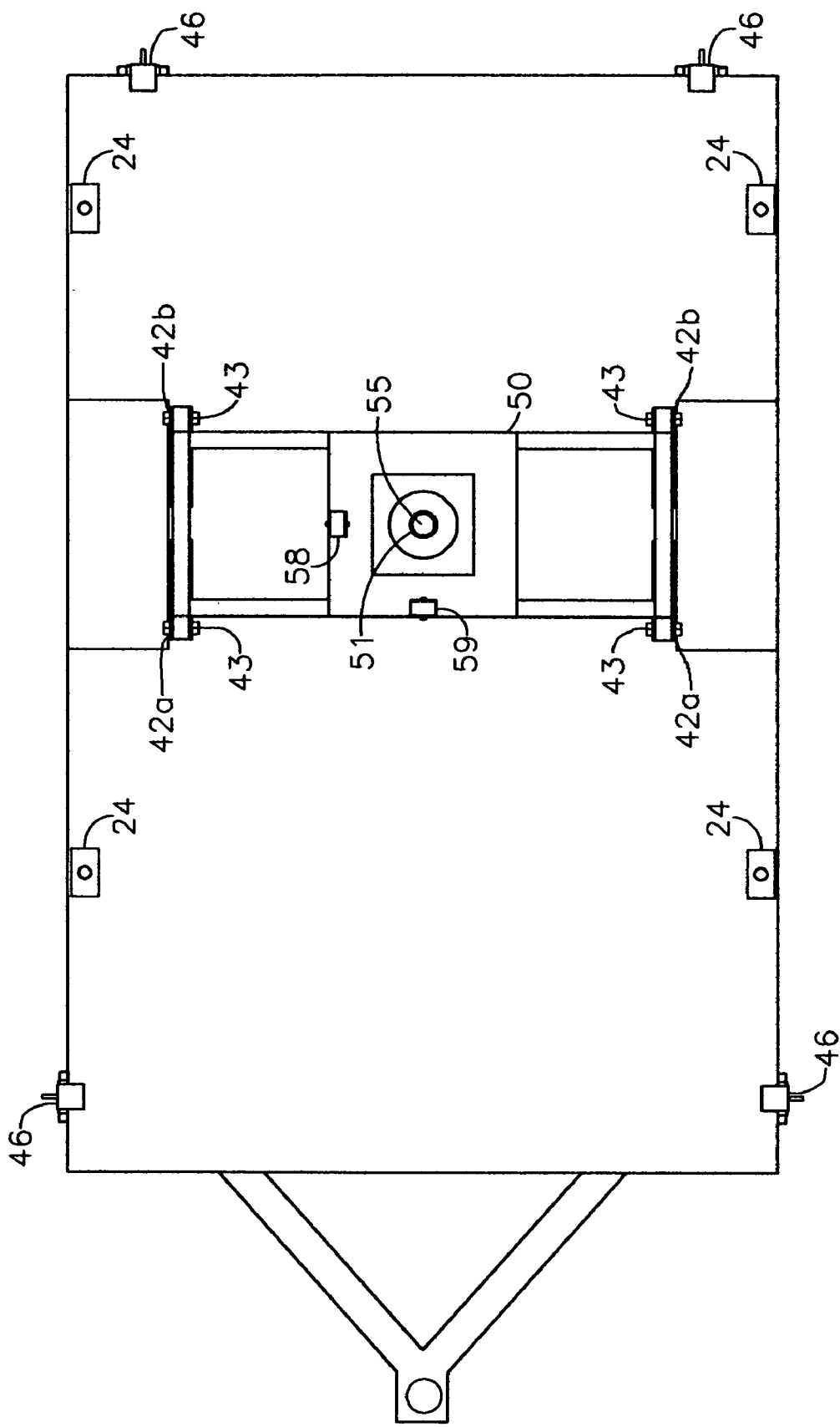
FIG. 5 is a bottom plan view of a utility trailer in accordance with one embodiment of the present invention.
Figure 6:
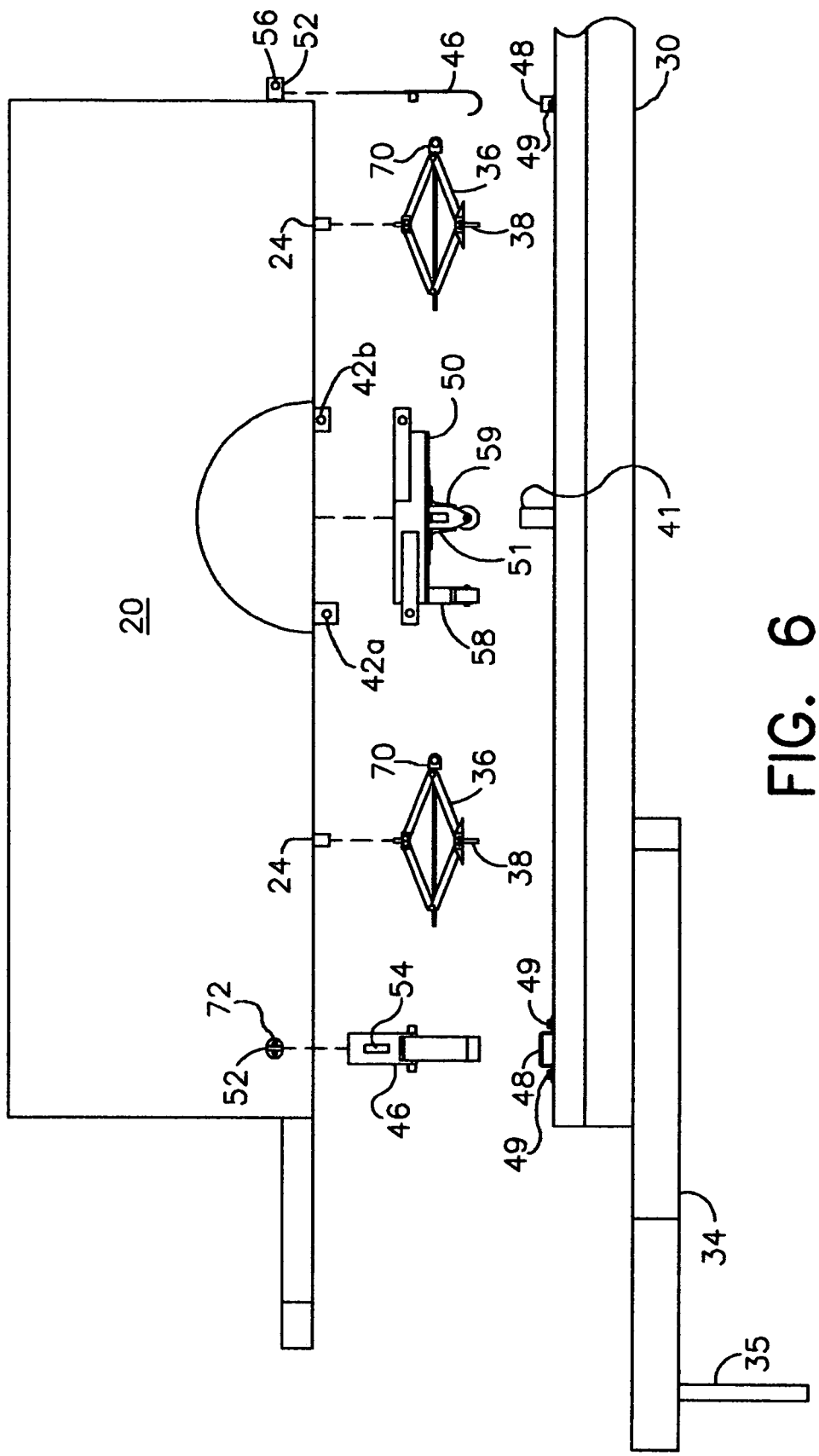
FIG. 6 is a side exploded view of certain elements of the present invention.

Once a destination has been reached, camper 20 may be rotated so that camper entrance 22 is moved from a first position near a side 57 of trailer 30 to a second position generally over wood bed 31, as shown in FIG. 3. In order to effect such rotation, first any clamps 46 are unlatched. Next, scissor jacks 36 are retracted so that camper 20 is fully supported by post 41 and its interface with receptacle 51, into which post 41 extends. A bearing disk 53 or other comparable bearing may optionally be provided within opening 55 to promote free movement of receptacle 51 on post 41. A lubricant such as grease may also be provided within opening 55 to reduce corrosion and wear and to promote free movement.

In order to provide additional stability to camper 20 while it is being rotated from a first position to a second position, optional wheel assemblies 58 and 59 may be attached to support frame assembly 50. A portion of wood bed 31 may be removed in the form of an arc shaped portion 29 so that wheel assemblies 58 and 59 may run on the relatively smooth, hard surface of bed 45 instead of wood bed 31, which may have gaps and imperfections and presents a less desirable surface for rolling wheels.

There are two general methods to configuring a camper 20 and a trailer 30 to incorporate the present invention. The first approach is for a utility trailer or camper manufacturer to provide attachment locations for receptacle 51, wheel assemblies 58 and 59, and the other elements described above on camper 20 and trailer 30. The other approach is to retrofit an existing camper and trailer with the above described elements.

Figure 7:
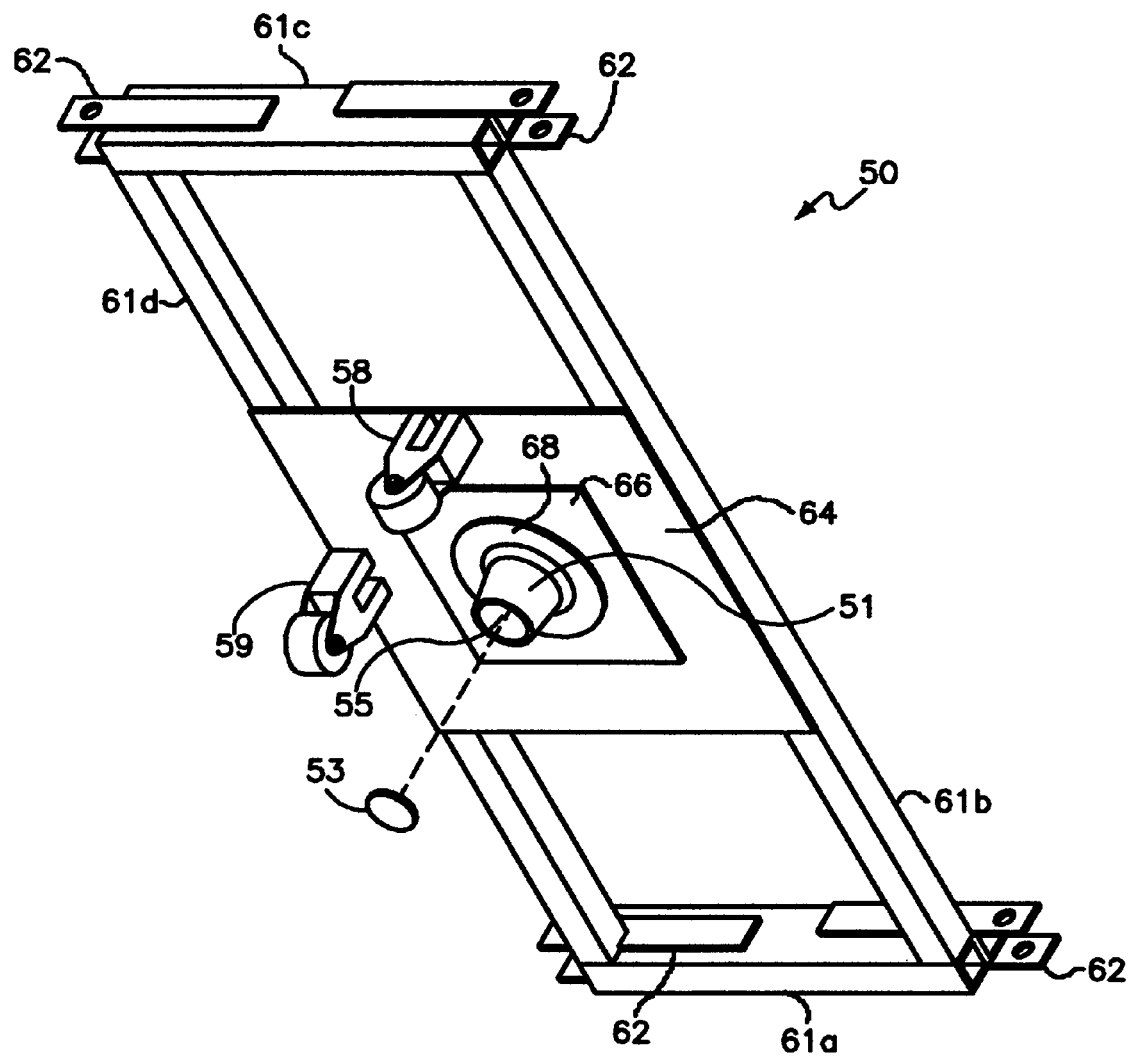
FIG. 7 is a bottom perspective view of the utility trailer support frame assembly.

The retrofit may be accomplished by first obtaining a standard pop-up camper configured with wheels and suspension. The suspension is then removed from suspension attach points 42a and 42b, shown in, for example, FIG. 6. Support frame assembly 50, shown in FIG. 7, is prepared separately for assembly. Assembly 50 comprises welded frame elements 61a, 61b, 61c and 61d. Attachment plates 62 are secured to frame elements 61a and 61c by one of a variety of known techniques, such as fasteners or welding. In the embodiment of FIG. 7, attachment plates 62 are welded to frame elements 61a and 61b. Center plate 64 is welded generally in the center of support frame assembly 50, and is either of sufficient thickness to support the weight of camper 20 during rotation or may be supported by additional frame members. Wheel assemblies 58 and 59 are also attached or welded to center plate 64.

Post receptacle 51 is also attached or welded to center plate 64, or may be attached to a receptacle mount plate 68, which may further be attached or welded to a receptacle support plate 66 that is then attached or welded to center plate 64. Support frame assembly 50 is secured to suspension attach points 42a and 42b by way of fasteners 43.

Posts 38 are of a suitable lengthy to provide maximum engagement with openings 39 when extended while assuring clearance with wood bed 31. Posts 38 are welded or attached to a bottom portion of jacks 36. Jacks 36 are then pivotally attached or welded to a convenient location on camper 20. In the embodiment shown lift points 24 provide a convenient attachment location for welding an upper portion jack 36 thereunto. This attach point was configured to be pivotal so that jack actuators 70 would be positioned in an accessible orientation when camper 20 is either in the first position or in the second position.

Brackets 48 are attached to wood bed 31 of trailer 30 using fasteners 49. Brackets 48 may also be attached to trailer frame bed 45. Clamps 46 are mounted on trailer 20 by way of rivets or fasteners (not shown) and latch brackets 52 are mounted on trailer 20 using a plurality of fasteners 72.

Wood bed 31 is added to trailer bed 45 to provide a comfortable walking surface as compared to a metal bed. Post 41 is welded to plate 37 then attached to trailer frame bed 45. Post 41 may also be attached to wood bed 31 depending on the weight of the trailer, the total area of plate 37 or other attachment methods, and the type of material used for wood bed 31.

The components and their mounting described above provide a kit and a relatively simple method of configuring a standard camper 20 and trailer 30 to be rotatable in accordance with the present invention.

Figure 8:
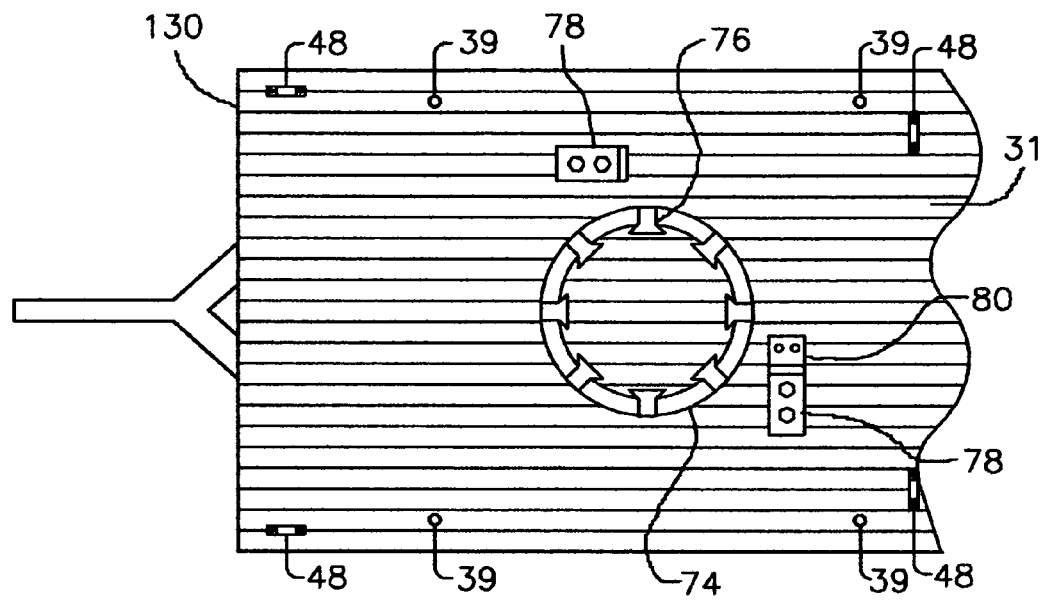
FIG. 8 is a top plan view of a portion of a second embodiment of a transport trailer with certain elements removed for clarity.

A second embodiment rotation system is shown in FIG. 8, where the utility trailer has been removed to simplify the drawing and clarify explanation. In this embodiment a track 74 has been attached to wood bed 31 of transport trailer 130. Flanged wheels 76 are attached to a camper by a support frame assembly similar to frame 50. Stops 78 attached to wood bed 31 interface with a stop bracket 80 that is mounted to the underside of a camper to aid in defining the limits or rotation.

Figure 9:
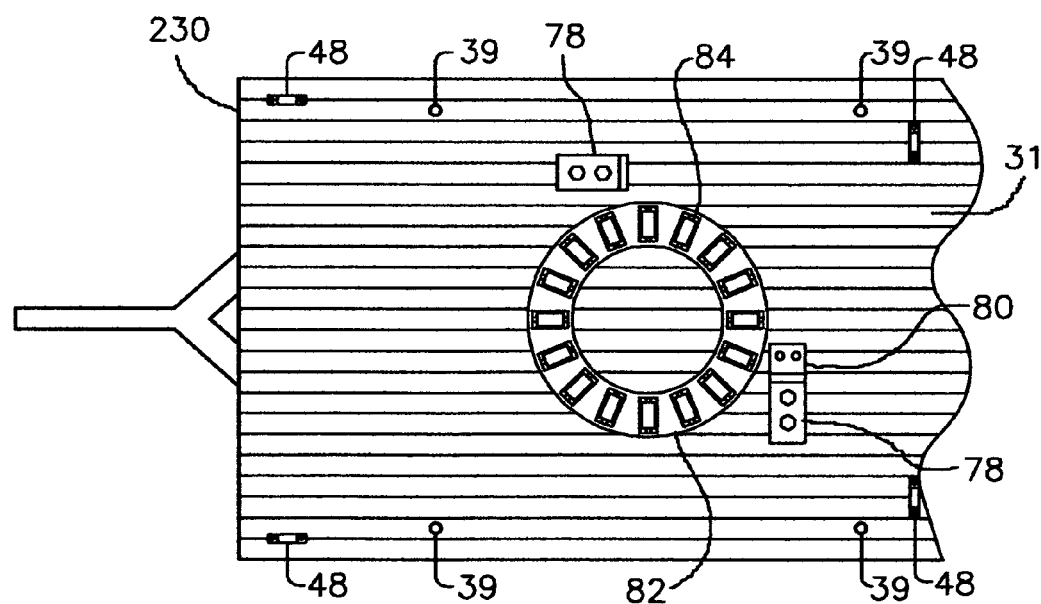
FIG. 9 is a top plan view of a portion of a third embodiment of a transport trailer with certain elements removed for clarity.

A third embodiment rotation system is shown in FIG. 9, where the utility trailer has again been removed to simplify the drawing and clarify explanation. In this embodiment a roller cage 82 is attached to wood bed 31 of transport trailer 230. Rollers 84 are contained in cage 82 and interface with a flat bearing surface formed or attached to the underside of a camper (not shown). As in the second embodiment, stops 78 attached to wood bed 31 interface with a stop bracket 80 that is mounted to the underside of a camper to aid in defining the limits of rotation. Note that in the second and third embodiment stop bracket 80 may be mounted to trailer 230 and stops 78 may be mounted on the underside of the utility trailer or camper.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalents thereof.

What is claimed is:

1. A utility trailer transport assembly, comprising:
   a frame having a front end, a rear end, and a pair of sides connecting the front end and the rear end transportably mounted on a plurality of wheels;
   a pop-up camper having a door mounted in proximity to the front end of the frame; and
   a bed supported by the frame extending from the pop-up camper to the frame rear end;
   wherein the pop-up camper is rotatable between a first position where the door is positioned adjacent to one of the pair of sides and a second position where the door is positioned to face the frame rear end.

2. The trailer transport assembly as set forth in claim 1, wherein the frame is part of a transport trailer.

3. The trailer transport assembly as set forth in claim 1, wherein the bed serves as a deck for the pop-up camper when the pop-up camper is in the second position.

4. The trailer transport assembly as set forth in claim 1, wherein the pop-up camper is rotatably mounted on a pivot.

5. The trailer transport assembly as set forth in claim 1, further comprising a plurality of jacks, wherein the jacks are lowered at the first position and the second position and raised during movement between the first position and the second position.

6. The trailer transport assembly as set forth in claim 1, wherein the pop-up camper is rotatably mounted on a plurality of wheels.

7. The trailer transport assembly as set forth in claim 6, wherein the pop-up camper is also rotatably mounted on a pivot.

8. The trailer transport assembly as set forth in claim 1, wherein the pop-up camper is secured in the first position by a plurality of clamps.

* * * * *